Patented July 29, 1941

2,250,664

UNITED STATES PATENT OFFICE 2,250,664

COMPOSITION OF MATTER AND ARTICLES FORMED THEREFROM

William W. Watkins, Buffalo, N. Y., assignor to E. I. du Pont de Nemours & Company, Wilmington, Del., a corporation of Delaware No Drawing. Application November 17, 1937, Serial No. 175,041

11 Claims. (Cl. 260—36)

This invention relates to new compositions of matter and articles formed therefrom. More particularly, it relates to polyvinyl alcohol modified with certain nitrogen containing alcohols as softeners therefor.

It has previously been suggested to soften polyvinyl alcohol such as in the form of threads, films, and the like with glycerin and similar materials. The softeners hitherto used, however, have either been too volatile or have resulted in a film which is of low softness, especially at low humidities.

It is therefore an object of this invention to prepare modified polyvinyl alcohol compositions. It is a further object to discover softeners for polyvinyl alcohol. It is a still further object to produce films, threads and the like of polyvinyl alcohol which are very much tougher than polyvinyl alcohol films, threads or the like, hitherto known.

These objects are accomplished in general by means of a composition comprising polyvinyl alcohol and a water-soluble nitrogen-containing alcohol of the general formula:

$$HO-R_1-NR_2R_3$$ 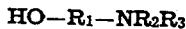

where $R_1$ is a divalent aliphatic hydrocarbon radical, $R_2$ and $R_3$ are hydrogen or any monovalent organic group, and where $R_2$ and $R_3$ are not the same mono-valent organic group.

As examples of softeners of the above class of compounds may be mentioned ethanolamine, diethanolamine, ethanol formamide (the best material that has been found), ethanol-p-toluene sulfonamide, cyclohexanol formamide, ethanol lactamide, diethanol lactamide, diethanol formamide, diethanol adipamide, tetraethanol adipamide, ethanolamine acetate, ethanolamine hydrochloride, ethanolamine lactate, ethanolamine sulfamate, diethanolamine formate, ethanolamine formate, diethanol acetoacetamide, ethanolacetamide, diethanoloxamide, and lactamide. The compounds used, of course, should be compatible with polyvinyl alcohol, and it has been found that all compounds which are in the above class are compatible in a greater or lesser degree. The compounds also vary in their softening effect.

The amount of softener included in the composition can vary within quite wide limits, provided there is sufficient to produce a softening effect and not so much that the product formed therefrom becomes sticky. Concentrations between 5% and 25% have been found most suitable. The most suitable concentration varies in the case of each softener used.

The softener can be incorporated in the polyvinyl alcohol in any desired fashion either before or after forming into a shaped article. In cases where the polyvinyl alcohol is coagulated by the dry or evaporative method, the softener is preferably incorporated prior to forming into a shaped article, while when coagulated by contacting with a liquid coagulating bath, the softener is preferably incorporated after formation into a shaped article.

The polyvinyl alcohol utilized according to this invention may be of any desired viscosity. It may contain varying amounts of ester or acetal groups.

Having described the invention, the following specific examples are now given:

Example I

To 100 grams of 15% polyvinyl alcohol solution are added 1.7 grams of ethanol formamide. After thorough mixing, this composition is perfectly clear. When cast on to a metal plate, it dries to a clear, soft, transparent film which maintains its softness even at low humidities.

Example II

To 100 grams of 13% polyvinyl alcohol solution are added 4.9 grams of diethanol lactamide. The mixture is stirred until a clear, homogeneous solution results. Films cast from this solution are found to be clear and transparent and evidence a high degree of softness at low humidities.

Example III

To 100 grams of 13% polyvinyl alcohol solution are added 2.3 grams of ethanolamine hydrochloride. The mixture is stirred until a clear, homogeneous solution results. Films cast from this solution are clear and soft even at low humidities.

Example IV

To 350 grams of 15% polyvinyl alcohol solution, 10.5 grams of ethanolamine acetate were added. The solution was stirred until homogeneous and was then cast into thin films on a metal plate. The films were conditioned for 48 hours at 85° F. and 7% relative humidity.

The polyvinyl alcohol compositions in accordance with this invention may be made up into films, tubes, bottle caps, threads, or other shaped articles. They are most useful in the formation of transparent films suitable for wrapping tissue. Films containing appropriate amounts of these softeners are perfectly clear and transparent and are, under given conditions of temperature and humidity, substantially softer and more durable than films of unmodified polyvinyl alcohol or those softened with glycerin or glycol. For example, a film made according to Example IV, conditioned at 85° F. and 7% relative humidity, made up into a standard rice filled bag and tested in a standard durability tumbling test averaged 529 drops per break. A bag made up as in Example IV but softened with a similar amount of glycerin, then conditioned and tested in exactly the same fashion as above averaged 14 drops per break. The elongation is ordinarily at least twice as great as similar films softened with glycerin.

Any variation or modification of the invention as described above which conforms to the spirit of the invention is intended to be included within the scope of the claims.

I claim:

1. A composition comprising polyvinyl alcohol and ethanol formamide.
2. A composition comprising essentially 15 parts polyvinyl alcohol, 85 parts water and 1.7 parts of ethanol formamide.
3. A composition comprising polyvinyl alcohol and alkanol amide.
4. A transparent sheet comprising polyvinyl alcohol and ethanol formamide.
5. A transparent sheet comprising essentially polyvinyl alcohol softened with an ethanol formamide.
6. A transparent sheet comprising essentially polyvinyl alcohol softened with an ethanol amide.
7. A transparent sheet comprising essentially polyvinyl alcohol softened with 5% to 25% of an alkanol amide.
8. A transparent sheet comprising essentially polyvinyl alcohol and ethanol formamide in the ratio of about 15 parts of polyvinyl alcohol to 1.7 parts of ethanol formamide.
9. A transparent sheet comprising polyvinyl alcohol and alkanol amide.
10. A composition comprising polyvinyl alcohol and ethanol acetamide.
11. A composition comprising polyvinyl alcohol and ethanol lactamide.

WILLIAM W. WATKINS.